(12) United States Patent
Diamond et al.

(10) Patent No.: US 11,485,302 B2
(45) Date of Patent: Nov. 1, 2022

(54) SYSTEMS AND METHODS FOR SMART CABIN ACTIVE ERGONOMICS

(71) Applicant: Ford Global Technologies, LLC, Dearborn, MI (US)

(72) Inventors: Brendan Diamond, Grosse Point, MI (US); Erik J. Christen, Royal Oak, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 499 days.

(21) Appl. No.: 16/596,600

(22) Filed: Oct. 8, 2019

(65) Prior Publication Data
US 2021/0101546 A1    Apr. 8, 2021

(51) Int. Cl.
| | | |
|---|---|---|
| *B60R 16/037* | (2006.01) | |
| *H04W 4/02* | (2018.01) | |
| *G06T 7/70* | (2017.01) | |
| *H04W 4/40* | (2018.01) | |
| *G06T 7/20* | (2017.01) | |
| *G06V 20/59* | (2022.01) | |
| *G06V 40/10* | (2022.01) | |

(52) U.S. Cl.
CPC ............ *B60R 16/037* (2013.01); *G06T 7/20* (2013.01); *G06T 7/70* (2017.01); *G06V 20/59* (2022.01); *G06V 40/103* (2022.01); *H04W 4/023* (2013.01); *H04W 4/40* (2018.02); *G06T 2207/30196* (2013.01); *G06T 2207/30268* (2013.01)

(58) Field of Classification Search
None
See application file for complete search history.

(56) References Cited

U.S. PATENT DOCUMENTS

| | | | |
|---|---|---|---|
| 9,707,912 B1 * | 7/2017 | Pena Casimiro | B60R 16/037 |
| 2006/0208169 A1 * | 9/2006 | Breed | G01S 7/4802 |
| | | | 250/221 |
| 2015/0379362 A1 * | 12/2015 | Calmes | G06V 10/60 |
| | | | 348/136 |
| 2018/0208204 A1 * | 7/2018 | Chen | G06F 1/1694 |

* cited by examiner

*Primary Examiner* — Thomas S McCormack
(74) *Attorney, Agent, or Firm* — Frank Lollo; Eversheds Sutherland (US) LLP

(57) ABSTRACT

Systems and methods are provided herein for adjusting vehicle features based on user preferences and physical dimensions. In some embodiments, the systems and methods described herein may more particularly relate to the automated adjustment of vehicle features such as, for example, seat positioning and mirror positioning, without requiring input from a user.

18 Claims, 3 Drawing Sheets

SYSTEMS AND METHODS FOR SMART CABIN ACTIVE ERGONOMICS

TECHNICAL FIELD

The present disclosure relates to systems and methods for smart cabin active ergonomics. In some embodiments, the systems and methods described herein may more particularly relate to the automated adjustment of vehicle features such as, for example, seat positioning and mirror positioning, with or without input from a user.

BACKGROUND

Every time a user enters a vehicle, they have to readjust certain features, such as the seating position, the steering wheel placement, and the rear and side view mirrors due to the stature difference amongst different users of the vehicle. The user might not make the most optimal adjustments for their physical dimensions. For example, the user might adjust the mirrors, but might not know how to adjust them to provide optimal viewing angles. The constant adjustment of seating position, steering wheel placement, and side and rear view mirrors is also a very real annoyance amongst shared vehicles in a family or work environment (e.g., construction sites), rental cars, and even when simply test driving a new vehicle.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

Figure 1:
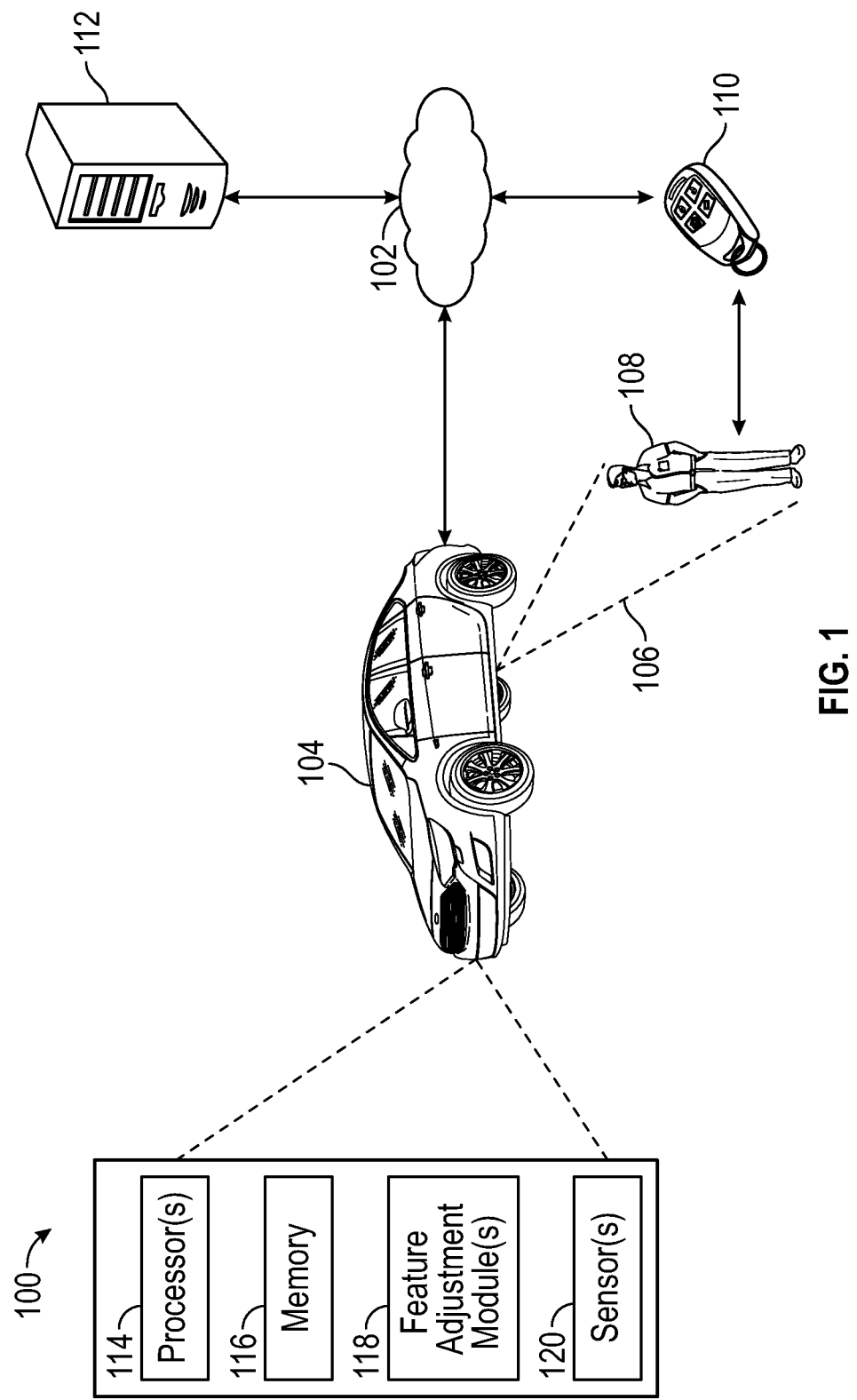
FIG. 1 depicts an illustrative architecture in accordance with one or more example embodiments of the disclosure.

The disclosure is directed to, among other things, systems and methods for smart cabin active ergonomics. In some embodiments, the systems and methods described herein may involve automatically performing adjustments of certain vehicle features before a user enters the vehicle, where the adjustments are performed based on information such as the physical dimensions of the user approaching the vehicle. The following descriptions of such systems and methods as disclosed herein are merely exemplary and are not confined to the embodiments described herein. For example, any descriptions may only be applicable to some embodiments. Moreover, alternative embodiments may include more or less steps than are shown or described herein.

The adjustment of the vehicle features may be based on a vehicle feature adjustment profile associated with the user. The vehicle feature adjustment profile may include information such as the height and weight of the user, physical dimensions of the user such as, for example, limb length and size, torso size, or any other relevant information about the physical attributes of the user. The vehicle feature adjustment profile may also include other preferences of the user, such as feature preferences that are not in line with the optimal feature settings based on their physical dimensions, or preferences for a particular style of driving, such as sporty or comfort, which may impact how the features of the vehicle are configured.

The vehicle feature adjustment profile information may be obtained by the vehicle itself when the user is within a proximity of the vehicle. The vehicle may include sensors or other data capture devices to perform a body scan of the user as the user approaches the vehicle. Once the user crossed a threshold proximity from the vehicle, the vehicle may perform the scan of the user to determine the physical dimensions of the user. The scan may be performed as the user is moving towards the vehicle, or the user may be required to stop in front of the vehicle and remain stationary for the vehicle to complete the scan to obtain the user's physical dimensions. Once the body scan of the user has been performed, and the physical dimensions of the user have been obtained, this information may be used to form the vehicle feature adjustment profile for the user. This information may then be stored at the vehicle itself, on a wireless device of the user (e.g., key fob, mobile device such as a smartphone, etc.), or at a cloud computing platform. In some instances, the information may not be stored anywhere, but rather the vehicle may perform body scans of the user every time the user approaches the vehicle.

The vehicle feature adjustment profile may be stored at the vehicle itself, on a wireless device of the user (e.g., key fob, mobile device such as a smartphone, etc.), or at a cloud computing platform. This information may be stored as the result of an initial scan performed on a user, or may be stored based on manual inputs from the user. For example, the user may provide their physical measurements without a body scan being performed by the vehicle. In some embodiments, the vehicle feature adjustment profile may be obtained from the location at which it is stored instead of or in addition to obtaining the vehicle feature adjustment profile from a body scan performed by the vehicle. For example, when the user is within a certain proximity of the vehicle, the vehicle may obtain the vehicle feature adjustment profile from a key fob of the user. This may serve to ensure a quicker adjustment process for frequent users of the vehicle.

The vehicle feature adjustment profile may be used to determine adjustments to make to one or more features of the vehicle prior to the user entering the vehicle. Examples of such features may include a seat height, a seat position relative to a steering wheel, a seat comfort setting, a seat bottom portion angle, a position of the steering wheel, an initial mirror location, or any other adjustable features within the vehicle. These adjustments may be performed before the user enters the vehicle as to provide the most optimal driving experience for the user without the user having to perform adjustments after entering the vehicle.

Additional adjustments may be made once the user enters the vehicle. For example, adjustments may be made to the mirrors of the vehicle (e.g., rearview mirror and side view mirrors) once the user has entered the vehicle and situated himself in his default driving pose. In some instances, the vehicle mirror adjustments may be made based on an eye position of the user. For example, an interior-facing dash camera or other similar video or image capture device may be facing the user when the user is sitting in the seat of the vehicle, and may be used to detect the eye position of the user. As another example, the eye position may be determined based on the physical attributes of the user included within the vehicle feature adjustment profile. In some instances, the position of the user's head may be used instead of, or in addition to, the location of the user's eyes. To ensure that the correct eye position is determined (the location that the user's eyes will typically be in while the user is driving the vehicle), several criteria may be required before the eye location is determined to perform the mirror adjustments. One example criteria may be that a rate of movement of the user's head must be below a particular threshold. Another example criteria may be that a threshold amount of period has elapsed. These are just example criteria that may be used to ensure that the user has had sufficient time to situate himself in the vehicle in the default position (or most likely position) they will be in during driving.

Feature adjustment may also be dynamic in that subsequent adjustments may take place after the initial feature adjustments are performed. In some instances, such adjustments may involve mirror adjustments, but adjustments to any of the other features described herein may be possible. For example, the vehicle's mirrors may readjust based on a new default position of the user. To do so, similar criteria may be used as when performing the initial mirror adjustments. The head movement rate of the user may be monitored to determine if it falls below a certain threshold (which may be the same or different than the threshold for the initial adjustment), and/or it may be determined if a threshold amount of time has elapsed since the head movement rate of the user fell below the threshold. When these (and any other relevant) criteria are met, the eye position (and/or head position) of the user may be determined again. If the location of either of the eye or head position is different, then the mirrors may re-adjust again. This may serve to ensure that the user is presented with the most optimal mirror angles even if they are not static in a single position the entire duration of the car ride.

Any of the vehicle feature adjustments described herein may be performed for multiple users entering a vehicle together. For example, a vehicle may include four doors with four possible seating locations to support up to four passengers (or users). Each door of the vehicle may include individual sensing capabilities so that as users approach different doors of the vehicle, the vehicle may perform any of the functions described herein, such as body scanning the users. This information may allow individual vehicle feature adjustment profiles for each user so that each individual seating location of the vehicle may perform adjustments according to the vehicle feature adjustment profile of the user that will be using the seat. The same may apply based on vehicle feature adjustment profiles stored on wireless devices associated with the various users. For example, a first user may have a first wireless device with an associated first vehicle feature adjustment profile and a second user may have a second wireless device with an associated second vehicle feature adjustment profile. The first user may approach the driver side door of the vehicle and the second user may approach the passenger side. The vehicle may detect the first user at the driver side door and may detect the first vehicle feature adjustment profile on the first wireless device. The vehicle may also detect the second user at the passenger side door and may detect the second vehicle feature adjustment profile on the second wireless device. The vehicle may then perform vehicle feature adjustments at the driver side seating area based on the first vehicle feature adjustment profile and vehicle feature adjustments at the passenger side seating area based on the second vehicle feature adjustment profile.

The vehicle features that are adjusted based on a user's vehicle feature adjustment profile may be reverted once the user exits the vehicle. In some instances, the features may revert back to the configuration they were in before the use entered the vehicle. In some instances, the features may revert back to a vehicle feature adjustment profile of a known primary driver of the vehicle (e.g., the owner of the vehicle). In some embodiments, the vehicle may not perform feature adjustments if the user entering the vehicle is not a primary driver, or otherwise allowed user, of the vehicle. For example, the vehicle may only perform adjustments as described herein if the primary driver is entering the vehicle or if a user the primary driver has indicated is also allowed is entering the vehicle.

The vehicle feature adjustments may also be based on additional information. For example, the mirror adjustments may depend on the interior and exterior dimensions of the vehicle. This may be because the dimensions of the vehicle effects the visibility of the user through the mirrors, so the optimal mirror location may depend on the vehicle make/model. The vehicle feature adjustments may be made based on a setting of the vehicle that has been selected by the user. For example, the vehicle may be set to a sport mode or a comfort mode. In the sport mode, the vehicle may perform such additional adjustments such as stiffening the seat and/or moving the seat to a more upright position. This additional information may be used in combination with the information from the vehicle feature adjustment profile to perform adjustments that would not normally be made using just the information from the vehicle feature adjustment profile.

Illustrative Embodiments

Turning now to the drawings, FIG. 1 depicts an illustrative architecture 100 in which techniques and structures of the present disclosure may be implemented. The illustrative architecture 100 may include a communications network 102, a vehicle 104, which may be capable of performing a body scan 106 on one or more users 108, a wireless device 110, which may also be in communication with the one or more users 108, and a server 112.

The communications network 102 may include any one or a combination of multiple different types of networks, such as cable networks, the Internet, wireless networks, and other private and/or public networks. In some instances, the communications network 104 may include cellular (e.g., 5G), Wi-Fi, or Wi-Fi direct.

A vehicle 104 may comprise at least one or more processor(s) 114, memory 116, one or more feature adjustment module(s) 118, and one or more sensor(s) 120. In some embodiments, the functionality of the module(s) described herein (for example, the feature adjustment module(s) 118) may also be implemented as a single module or any other number of module(s).

The vehicle 104 may include one or more processors 114 that may include any suitable processing unit capable of accepting digital data as input, processing the input data based on stored computer-executable instructions, and generating output data. The computer-executable instructions may be stored, for example, in data storage and may include, among other things, operating system software and application software. The computer-executable instructions may be retrieved from the data storage and loaded into the memory 116 as needed for execution. The processor 114 may be configured to execute the computer-executable instructions to cause various operations to be performed. Each processor 114 may include any type of processing unit including, but not limited to, a central processing unit, a microprocessor, a microcontroller, a Reduced Instruction Set Computer (RISC) microprocessor, a Complex Instruction Set Computer (CISC) microprocessor, an Application Specific Integrated Circuit (ASIC), a System-on-a-Chip (SoC), a field-programmable gate array (FPGA), and so forth.

The memory 116 may be volatile memory (memory that is not configured to retain stored information when not supplied with power) such as random access memory (RAM) and/or non-volatile memory (memory that is configured to retain stored information even when not supplied with power) such as read-only memory (ROM), flash memory, and so forth. In various implementations, the memory 116 may include multiple different types of memory, such as various forms of static random access memory (SRAM), various forms of dynamic random access memory (DRAM), unalterable ROM, and/or writable variants of ROM such as electrically erasable programmable read-only memory (EEPROM), flash memory, and so forth.

The feature adjustment module(s) 118 may perform operations including at least determining that a first user is within a threshold proximity of a vehicle. The feature adjustment modules 118 may also perform operations including receiving a first vehicle feature adjustment profile associated with the first user, wherein the first vehicle feature adjustment profile is received from a wireless device associated with the first user or is determined using a sensor to perform a body scan of the first user. The feature adjustment modules 118 may also perform operations including sending, based on the first vehicle feature adjustment profile, an indication to adjust one or more features of the vehicle, wherein the one or more features comprise at least: a height and position of a seat, an angle of a bottom portion of the seat, a comfort setting of the seat, an initial rear and side view mirror positioning, and a steering wheel location. The feature adjustment module(s) 118 may also perform any of the other operations described herein.

The sensors 120 may include any sensors for capturing data in the environment of the vehicle 104, including, for example, audio sensors, video sensors, accelerometers, gyroscopes, temperature sensors, proximity sensors, LIDAR, etc. The sensors 120 may be used to perform a body scan 106 of the user 108.

The wireless device 110 may be any device capable of storing information used by the vehicle 104 or performing certain functions associated with the vehicle 104. For example, the wireless device 110 may be in the form of a key fob or may be in the form of a user device such as a smartphone. As another example, the wireless device 110 may be a device used to perform functions such as Phone as a Key (PaaK) to open the doors of the vehicle as the user approaches. The wireless device 110 may store information used by the vehicle 104 to perform vehicle feature adjustments, such as a vehicle feature adjustment profile for the user 108. The vehicle 104 may be able to detect the wireless device 110 when it is in a particular proximity of the vehicle, which may be defined by a threshold distance. This detection of the wireless device 108 crossing this threshold may in turn trigger the vehicle 104 to perform functions such as the body scan 106 of the user 108, and/or performing vehicle feature adjustments before the user 108 enters the vehicle 104.

The server 110 may serve as a remote cloud platform for performing any of the functionality described herein, such as the operations with respect to the vehicle 104 in performing vehicle feature adjustments based on vehicle feature adjustment profiles and other relevant information.

Figure 2:
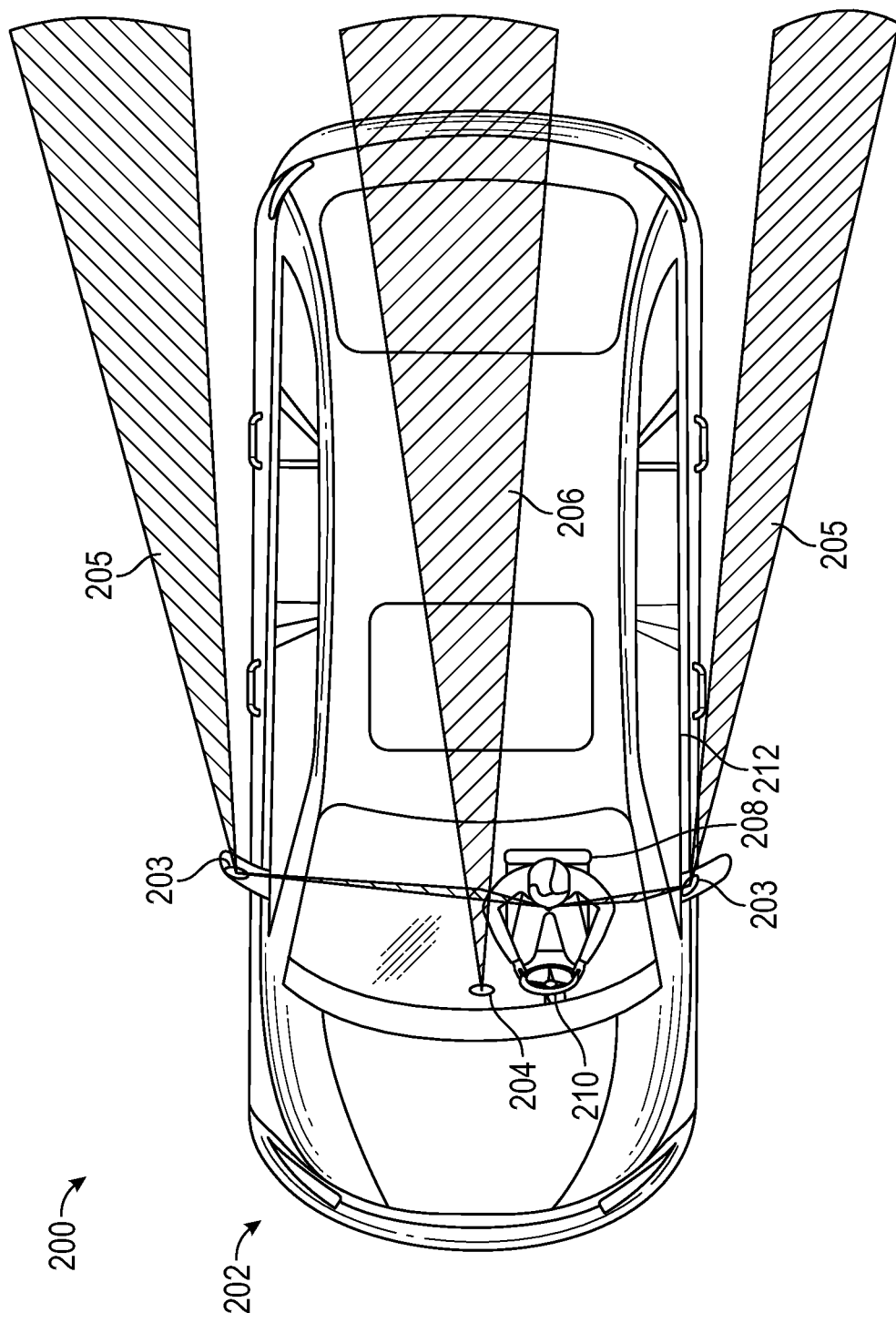
FIG. 2 depicts a visualization of vehicle feature adjustment in accordance with one or more example embodiments of the disclosure.

FIG. 2 depicts a visualization 200 of vehicle feature adjustment for an example vehicle 202 (which may be the same as vehicle 104 depicted in FIG. 1). The vehicle 202 may include one or more side view mirrors 203 and a rearview mirror 204. The side view mirrors 203 may have a side view mirror field of view 205, and the rearview mirror may have a review mirror field of view 206. The vehicle may also include one or more seats 208, a steering wheel 210, and at least one door 212. A user 214 (which may be the same as user 106 depicted in FIG. 1) may approach the door 212 of the vehicle 202. Once the user 214 reaches a proximity location 216 of the vehicle 202, the vehicle may be able to detect a wireless device of the user. The vehicle may then either obtain a vehicle feature adjustment profile that is stored on the wireless device of the user 214, or may proceed to perform a body scan of the user to determine at least the physical dimension of the user 214 for use to create a vehicle feature adjustment profile for the user 214.

Figure 3:
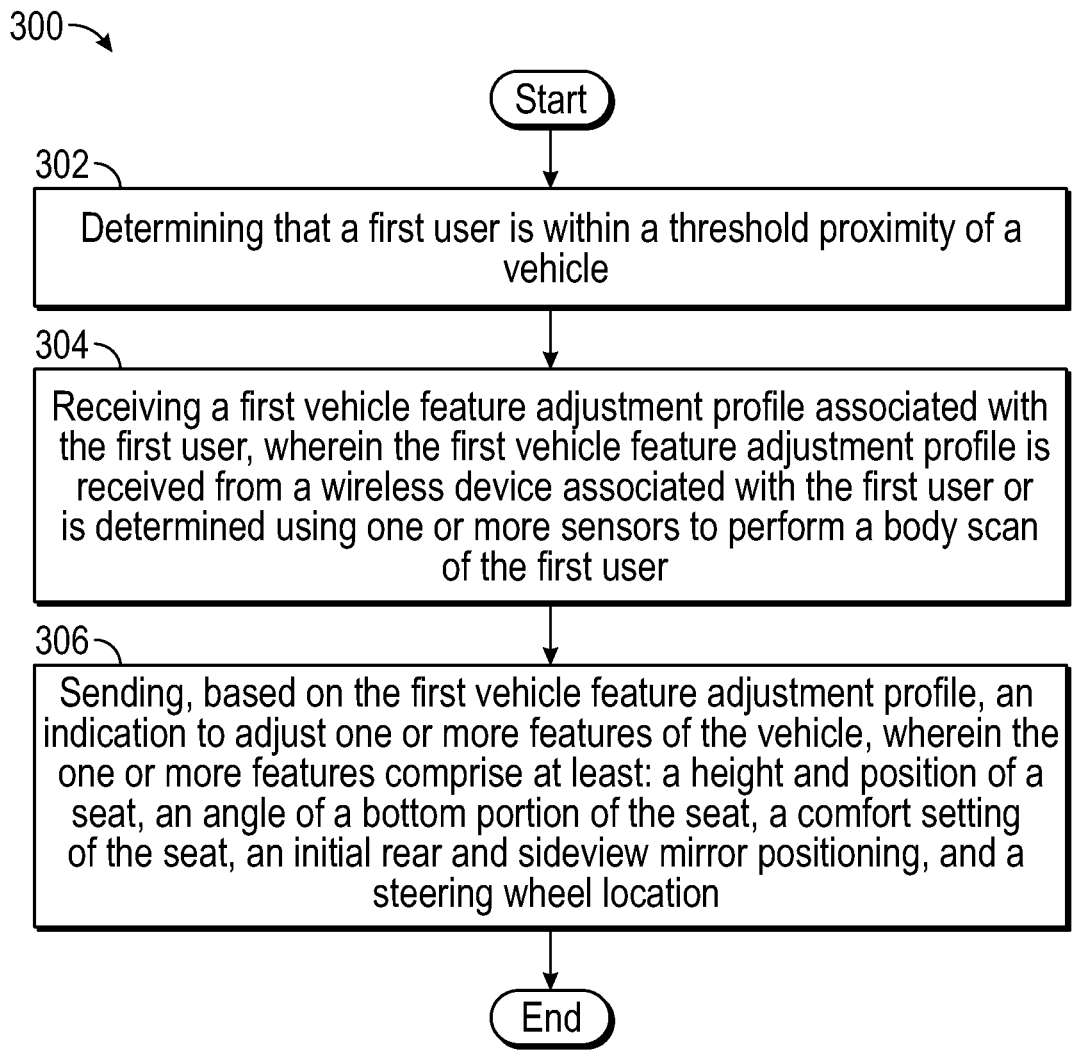
FIG. 3 depicts a flowchart of an example method in accordance with one or more example embodiments of the disclosure.

FIG. 3 is a flowchart of an example method of the present disclosure. The method may include an operation 302 of determining that a first user is within a threshold proximity of a vehicle. The determination may be made, for example, by a sensor located at a door of the vehicle the user is approaching, such as a proximity sensor. As another example, the vehicle may be in communication with a mobile device of the user and use the GPS location of the mobile device to determine the location of the user relative to the vehicle. These are merely examples, and are not intended to limit the scope of the manner in which the vehicle determines the user is within a certain proximity.

The method may include an operation 304 of receiving a first vehicle feature adjustment profile associated with the first user, wherein the first vehicle feature adjustment profile is received from a wireless device associated with the first user or is determined using a sensor to perform a body scan of the first user. For example, as the user approaches the vehicle, the vehicle may perform a scan of the user to determine various bodily proportions and sizes for the user. The vehicle may determine that the user has longer legs, so the seat needs to be adjusted backwards to best accommodate the user. The user may also already have this information stored on his wireless device (e.g., mobile phone), such that the vehicle may simply receive the information from the wireless device without having to perform a scan of the user. The information may be in the form of the vehicle adjustment profile that is used by the vehicle to determine what adjustments need to be made to particular features of the vehicle before the user enters the vehicle.

The method may include an operation 306 of sending, based on the first vehicle feature adjustment profile, an indication to adjust one or more features of the vehicle, wherein the one or more features comprise at least: a height and position of a seat, an angle of a bottom portion of the seat, a comfort setting of the seat, an initial rear and side view mirror positioning, and a steering wheel location. An indication, for example, may be an instruction or message to the vehicle that causes the vehicle to perform the adjustment of the one or more features. For example, the indication may be an instruction to change the seat position based on the first vehicle adjustment profile.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, one skilled in the art will recognize such feature, structure, or characteristic in connection with other embodiments whether or not explicitly described.

Implementations of the systems, apparatuses, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that stores computer-executable instructions is computer storage media (devices). Computer-readable media that carries computer-executable instructions is transmission media. Thus, by way of example, and not limitation, implementations of the present disclosure can comprise at least two distinctly different kinds of computer-readable media: computer storage media (devices) and transmission media.

Computer-executable instructions comprise, for example, instructions and data which, when executed at a processor, cause a general purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

While various embodiments of the present disclosure have been described above, it should be understood that they have been presented by way of example only, and not limitation. It will be apparent to persons skilled in the relevant art that various changes in form and detail can be made therein without departing from the spirit and scope of the present disclosure. Thus, the breadth and scope of the present disclosure should not be limited by any of the above-described exemplary embodiments but should be defined only in accordance with the following claims and their equivalents. The foregoing description has been presented for the purposes of illustration and description. It is not intended to be exhaustive or to limit the present disclosure to the precise form disclosed. Many modifications and variations are possible in light of the above teaching. Further, it should be noted that any or all of the aforementioned alternate implementations may be used in any combination desired to form additional hybrid implementations of the present disclosure. For example, any of the functionality described with respect to a particular device or component may be performed by another device or component. Further, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A vehicle comprising:
   a sensor located at a door of the vehicle;
   a processor; and
   a memory storing computer-executable instructions, that when executed by the processor, cause the processor to:
   determine a first user is within a threshold proximity of the vehicle;
   receive a first vehicle feature adjustment profile associated with the first user, wherein the first vehicle feature adjustment profile includes information about the first user;
   send, based on the first vehicle feature adjustment profile, a message to adjust one or more features of the vehicle;
   determine the first user has entered the vehicle;
   determine a head of the first user is not moving beyond a first threshold rate;
   determine, based on the determination that the head of the first user is not moving beyond a first threshold rate, a first eye location of the first user; and
   send a message to adjust at least one of a rearview mirror or one or more sideview mirrors of the vehicle, wherein the adjustment is based on the first eye location of the first user.

2. The vehicle of claim 1, wherein the first vehicle feature adjustment profile is received from a wireless device associated with the first user or is determined using the sensor to perform a body scan of the first user.

3. The vehicle of claim 2, wherein the body scan is used to determine at least one of a height, a weight, or one or more other physical dimensions of the first user.

4. The vehicle of claim 1, wherein computer-executable instructions to determine a first eye location of the first user within the vehicle is also based on a first threshold period of time having elapsed.

5. The vehicle of claim 1, wherein the adjustment of at least one of a rearview mirror or one or more sideview mirrors of the vehicle is also based on interior and exterior dimensions of the vehicle.

6. The vehicle of claim 1, wherein the computer-executable instructions further cause the processor to:
   determine a second eye location of the first user within the vehicle; and
   determine that the first user is not moving their head beyond a first threshold rate; and send a message to adjust at least one of: a rearview mirror and or side mirrors of the vehicle, wherein the adjustment is based on the second eye location of the first user.

7. The vehicle of claim 1, wherein the one or more features comprise at least a height and position of a seat, an angle of a bottom portion of the seat, a comfort setting of the seat, an initial rear and side view mirror positioning, and a steering wheel location.

8. The vehicle of claim 1, wherein the computer-executable instructions further cause the processor to:
determine that the first user has exited the vehicle; and
send, based on the determination that the first user has exited the vehicle, a message to revert the one or more vehicle features to a configuration saved for a primary driver of the vehicle.

9. A method comprising:
determining, using a sensor of a vehicle, that a first user is within a threshold proximity of a vehicle;
receiving a first vehicle feature adjustment profile associated with the first user, wherein the first vehicle feature adjustment profile includes information about the first user;
sending, based on the first vehicle feature adjustment profile, a message to adjust one or more features of the vehicle;
determining that the first user has exited the vehicle; and
sending, based on the determination that the first user has exited the vehicle, a message to revert the one or more vehicle features to a configuration saved for a primary driver of the vehicle.

10. The method of claim 9, wherein the first vehicle feature adjustment profile is received from a wireless device associated with the first user or is determined using a sensor of the vehicle to perform a body scan of the first user.

11. The method of claim 10, wherein body scan is used to determine at least one of: a height, a weight, or one or more other physical dimensions of the first user.

12. The method of claim 9, further comprising:
determining that the first user has entered the vehicle;
determining that a head of the first user is not moving beyond a first threshold rate;
determining, based on the determination that the head of the first user is not moving beyond a first threshold rate, a first eye location of the first user; and
sending a message to adjust at least one of: a rearview mirror and or one or more side mirrors of the vehicle, wherein the adjustment is based on the first eye location of first the user.

13. The method of claim 12, wherein determining a first eye location of the first user within the vehicle is also based on a first threshold period of time having elapsed.

14. The method of claim 12, further comprising:
determining a second eye location of the first user within the vehicle; and
determining that the first user is not moving their head beyond a first threshold rate; and
sending a message to adjust at least one of: a rearview mirror and or side mirrors of the vehicle, wherein the adjustment is based on the second eye location of the first user.

15. The method of claim 12, wherein the adjustment of at least one of: a rearview mirror or one or more side view mirrors of the vehicle is also based on interior and exterior dimensions of the vehicle.

16. The method of claim 9, wherein the one or more features comprise at least a height and position of a seat, an angle of a bottom portion of the seat, a comfort setting of the seat, an initial rear and side view mirror positioning, and a steering wheel location.

17. A vehicle comprising a door and a sensor located at the door;
a processor; and
a memory storing computer-executable instructions, that when executed by the processor, cause the processor to:
determine that a first user is in proximity of the door
receive a first vehicle adjustment profile from at least one of: a wireless device associated with the first user or an output of a body scan of the first user performed by the sensor located at the door, wherein the first vehicle adjustment profile comprises information about a set of physical dimensions of the first user;
send, based on the first vehicle adjustment profile, a message to adjust one or more vehicle features of the vehicle at a location of the vehicle where the first user is entering the vehicle, wherein the one or more vehicle features comprise at least one of: a seat height, a seat position relative to a steering wheel, a seat comfort setting, a seat bottom portion angle, a position of the steering wheel, an initial mirror location;
determine that the first user has entered the vehicle, a threshold period of time has elapsed, and a rate of movement of a head of the first user is below a threshold rate;
determine, based on the determination that the first user has entered the vehicle, a threshold period of time has elapsed, and a rate of movement of a head of the first user is below a threshold rate, an eye location of the first user based at least on physical dimensions of the first user and an image captured by a dash camera located on an interior of the vehicle; and
send, based on the eye location of the first user, a message to adjust mirrors of the vehicle to an optimal location for maximum field of view for the first user.

18. The vehicle of claim 17 wherein the computer-executable instructions further cause the processor to:
determine, based on a second sensor at a second door of the vehicle that a second user is in proximity of the second door;
receive a second vehicle feature adjustment profile associated with the second user; and
send, based on the second vehicle adjustment profile, a message to adjust one or more features of the vehicle at a first seat location associated with the door based on the first vehicle adjustment profile and to adjust one or more features of the vehicle at a second seat location associated with the second door based on the second vehicle adjustment profile.

* * * * *